S. Tarver,
Circular Saw Mill.
No. 26,381. Patented Dec. 6, 1859.
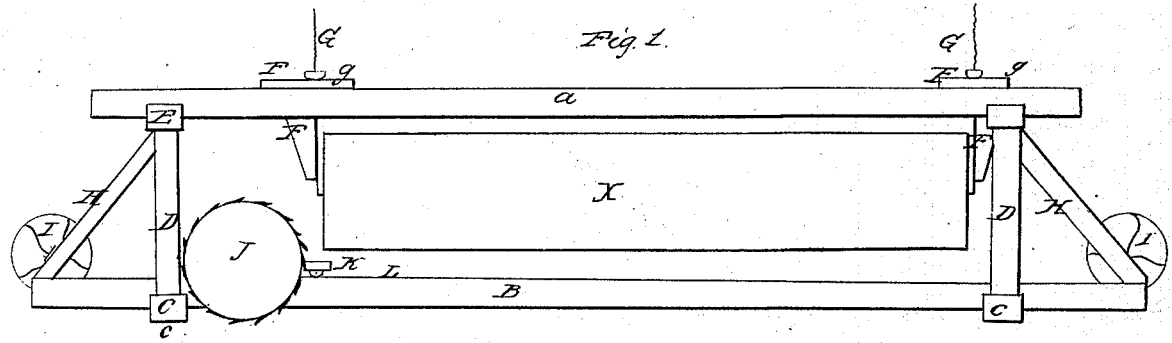
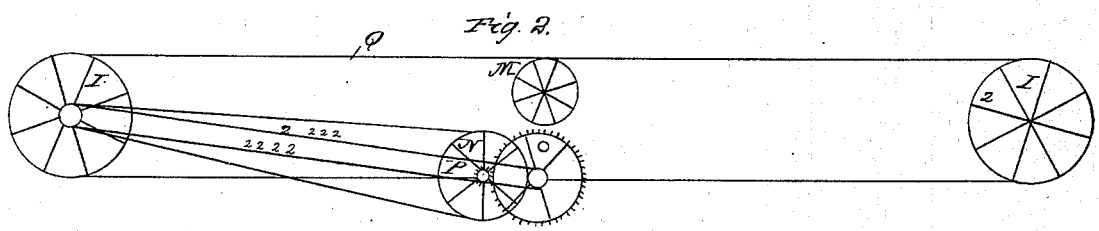
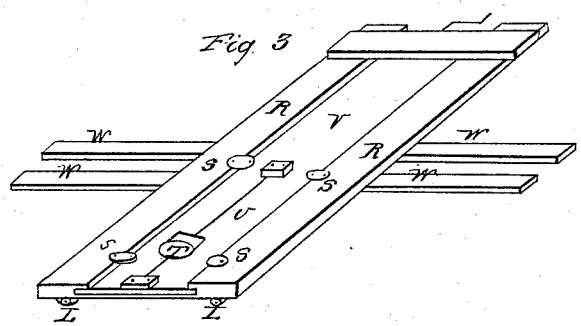
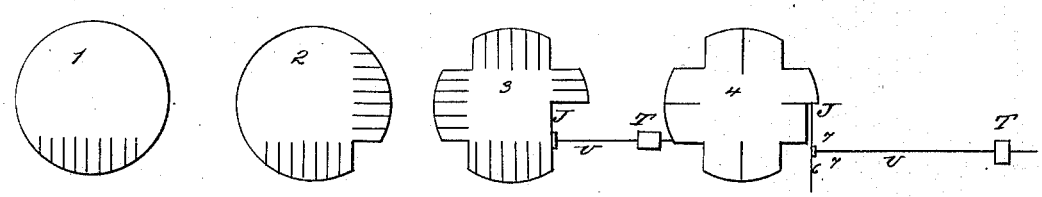
attest
M. F. Tarver
Thos. H. Mathews
Inventor
Samuel Tarver

UNITED STATES PATENT OFFICE.

SAMUEL TARVER, OF SEARCY, ARKANSAS.

SAWMILL.

Specification of Letters Patent No. 26,381, dated December 6, 1859.

*To all whom it may concern:*

Be it known that I, SAMUEL TARVER, of Searcy, county of White, and State of Arkansas, have invented a new and Improved Machine for Sawing Lumber; and I hereby declare the following to be a full, clear, and exact description of the construction and operation of the same, reference being had to the annexed drawings, which make part of this specification.

Since utility and practicability enter largely into the question as to obtaining Letters Patent, you will please allow me to state, that the nature and design of my invention consist in so arranging its parts, as that great saving in motive and in timber is effected, by accomplishing with a small thin circular saw, all that can be done with a large thick one; and in so suspending the log or stock upon pivots or centers, as to make it most easily controlled while being sawed, and in setting the saw at every line run to the log, instead of setting the log to the saw. And of causing the saw to feed along to the log on a light carriage, and to a perfectly true guide, instead of the log to the saw, having greatly in view the much smoothness of plank made by a small saw, over that of plank made by a large saw.

I will now proceed to describe the construction of my machine.

In Figure 1, we have a profile or side view. A, B, C, D, E, H constitute one side of the wooden stand upon which the log X suspends, and upon which the saw J, feeds along and gigs back. B is a sill 4 inches thick, 8 inches wide, and about 18 feet long, having its parallel and equiform mate about 4 feet apart, upon both of which the saw carriage travels. These sills are notched down and wedged down into cross ties, of which c, c, are the ends. Upon these cross ties, arise two trestles about three feet high, of which D, D, are the uprights, and E, E, the ends of the cap sills. Upon these trestles lay two timbers 4 inches thick, 8 inches wide, about 4 inches apart, whereof A is representative. Upon these last named timbers set the head-blocks F F, upon whose pivot bolts G, G, the log X suspends. H, H, are braces reaching from the sills to the cap sills, and upon which the bearings of the shafts containing the pulleys I, I, are built.

I will now describe the construction of the saw carriage, by referring your attention to Fig. 3. This figure represents a double frame work. To the outside or female frame of which R, R are its sides, are fastened two guide timbers W, W, by which the rectilinear motion of the saw is secured. V represents the male frame, upon which the saw shaft finds its bearings, and by which the saw gets its rectangular motion, while being set out to the stock, by the screw and crank Z. s, s, s, s, are guides by which one frame is kept in the other while setting the saw out, or calling it back. T is the saw pulley, and is to be induced to its rectilinear relationship with the pulleys I, I of Fig. 1, by a guide upon each side of it, finding support upon one or both sides of the timbers R, R, of Fig. 3. Upon the bottom of the saw carriage are 4 rollers of which L, L, in Fig. 3 are two, for the easy locomotion of the same. The guides W, W, of Fig. 3 are made effective by having a straight and true timber applied between them, which timber fastens upon the cross ties of Fig. 1, like the sills of the same.

By referring to Fig. 2, you will perceive how the saw gets its motions. Let M represent the saw pulley. This pulley is encircled by round belting passing from each side of itself to the pulleys 1, I, and 2 I, and uniting at Q. Now if the pulley 1—I be put in motion by any driving wheel, it is evident that the saw pulley will partake the same motion; and without a discontinuation of the same motion, the saw, by suitable gearing may be plied anywhere between the I pulleys. The feed and back motion of the same is obtained, from the shaft of first I pulley, on the same principle, that like motion is obtained from the saw shaft of ordinary circular mills for the log carriage. Thus if a belt pass from shaft of (1) first I pulley to pulley N, the pinion P of the shaft of N will operate upon the rag wheel C. Upon the shaft of this rag wheel is a pinion which exerts itself upon a straight line of spurs fastened to the bottom of the carriage. When it is desired to get the gigging back of the saw, let the pinion P be thrown out of gear, then by tightening upon the slack belt 2 2 2 2 &c., the motion will be obtained. The pulley M is not intended to be fastened to its saw shaft, but allowed to be penetrated by its shaft, just as the saw is set out or in by the crank Z of Fig. 3. The saw shaft must therefore have a continuous key upon it, so that the key seat of the pulley, and key of the shaft are adjustable.

Next, by referring to Fig. 4, we have the geometry by which a stick of timber 2 feet in diameter is divided into plank by a circular saw 18 or 20 inches in diameter. I will first state that the saw has no nave or nut on its outside. The saw is fastened to its shaft by three or more bolts passing through a collar of the shaft, and screwing into a ring of metal which is riveted or soldered to the center of the saw, as in Fig. 4, wherein J is the saw, U is the shaft, T the pulley, 6 the metal tap or ring into which the bolts 7, 7 are seen passing through the collar of saw shaft into said ring of metal. When the stock is to be suspended for saw, let a hole be bored in each end of it 2 or 3 inches deep of 1½ inch caliber say. When the stock is rolled up to its place, let the pivots of the head blocks F F be introduced; then by coming up 2 or 3 times upon the taps 9, 9 of Fig. 1, the timbers upon which the stock was rolled will be relieved, and ready for removal, when the stock will be suspended upon centers. Now by the turning down upon the taps 9, 9, the stock can be lowered, so that the saw may enter any desired depth into it. The stock being now made stationary by dogs reaching from any suitable point, the saw is put in motion and allowed to run a line, then it is backed and set out by the screw and crank Z of Fig. 3, and so on until a series of lines is run throughout the stock as represented by diagram 1 of Fig 4. The log is next turned over, and another series of lines run at right angles to the first, and so on until all four sides are sawed, as seen in diagram 23 of Fig. 4, wherein 4 corners are observed to have been taken out by the meeting of the lines. Now if the stock be lowered six inches, you will perceive that a number of plank can be cut off by a line which reaches to the center line of the stock. By turning, the same thing may be done at every angle. When this trimming of the stock is being effected the lateral position of the saw should not be disturbed by the crank Z of Fig. 3; otherwise the square within the circle of the stock will not be accomplished. When this square is accomplished if it is only double the depth that the saw will cut, it can be turned into plank, just equal in width to the diameter of the entire saw blade, minus the diameter of the collar and ring of the saw and shaft. This can be effected, by running a series of lines on one side, and by meeting them with a similar series on the other. This can only be done upon the completion of the stock into timbers or plank. If it be desirable, in a stock of 24 inches diameter say, 12 lines may be run, and six inch plank trimmed off, as in diagram 4 of Fig. 4, wherein is seen the saw J operating upon a 6 inch tier.

What I claim as my invention and desire to secure by Letters Patent of the United States of America is—

1. The arrangement of the parts A, B, C, D, E, H, I, J, K, L of Fig. 1. I say arrangement, because I cannot claim the invention of pulleys, saws, rollers, shafts &c., these being in use everywhere, but simply claim the peculiar manner in which they are arranged.

2. I claim the construction of the saw carriage as described above and by drawing of Fig. 3.

SAMUEL TARVER.

Witnesses:
M. F. TARVER,
THOS. WATKINS.